INVENTOR
ROGER PRÉJEAN
By Linton and Linton
ATTORNEYS

United States Patent Office 2,968,095
Patented Jan. 17, 1961

2,968,095

IMPROVEMENT IN RECIPROCATING CUTTERS FOR DRY SHAVERS AND CLIPPERS

Roger Préjean, Joffre la Celle-Saint Cloud, France, assignor to Societe Anonyme Defim, a corporation of France Filed Sept. 18, 1959, Ser. No. 840,871

1 Claim. (Cl. 30—43)

The present invention is concerned with an improvement in reciprocating cutters for dry shavers and clippers.

Apparatus for dry shaving, hair cutting or beard trimming is known in which the cutting element is subjected to a reciprocating rectilinear motion inside a fixed comb. In such known apparatus the cutting elements are so heavy that they set up considerable vibrations. Furthermore, the driving pin or finger of each cutting element works directly inside a buffer of rubber or an elastic plastic material integral with each cutting element, as a result of which, due to the compression or deformation of said buffer, a variation is caused in the reciprocating rectilinear stroke of the cutting element.

The principal object of the present invention is to provide improvements in reciprocating cutters tending to reduce the amplitude of the vibrations produced by the rapid reciprocating motion of the cutter and also to prevent variations in the length of the stroke of said cutter due to compression and wear of the elastic buffer by the driving pin.

In accordance with the invention the reduction of the vibrations is obtained by a new form of the cutter which has a weight of less than one half that of the previously known cutter of comparable length. On the other hand, the elastic buffer which incorporates a recess the two opposite sides of which are subjected to the action of the drive pin, is reinforced internally by an inserted metal cladding which prevents any deformation or wear of said sides.

In order that the invention may be clearly understood it will now be described more fully with reference to the accompanying drawing, in which.

Figure 1:
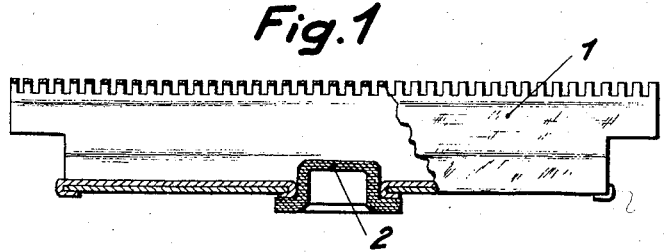
Fig. 1 is a side elevation partly in section of a cutter of known type.

Reference numeral 1 of Fig. 1 refers to a conventional previously known type of cutter containing in the center of its lower part a buffer 2 of elastic material.

Figure 2:
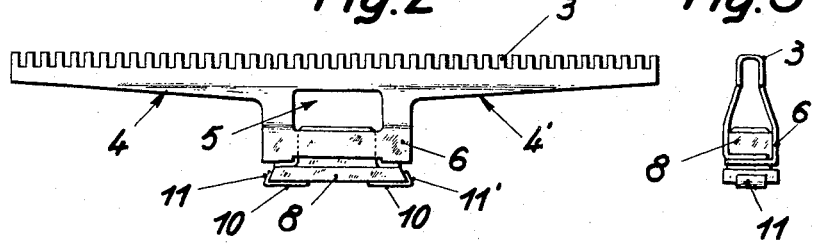
Fig. 2 is a side elevation of an example of the cutter according to the present invention.
Figure 3:
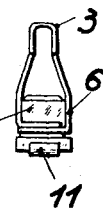
Fig. 3 is a left end view of the cutter of Fig. 2.
Figure 4:
Fig. 4 is a plan view of the cutter of Fig. 2.
Figure 5:
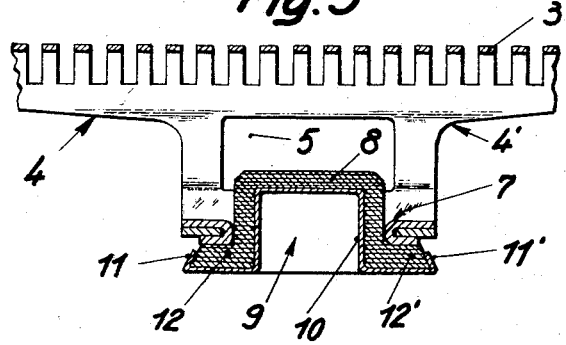
Fig. 5 is a fragmentary sectional view on an enlarged scale showing details of the internally reinforced elastic buffer forming part of the present cutter.
Figure 6:
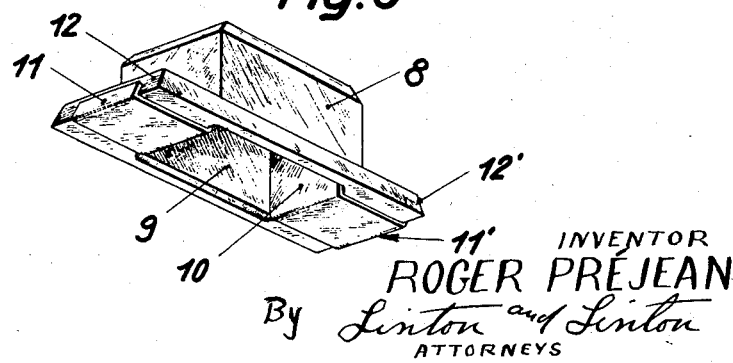
Fig. 6 is a fragmentary underneath perspective view of the buffer as viewed from below the same.

Fig. 2 shows a cutter, in accordance with the present invention with the cutter 3 having undercut edges at 4 and $4^1$ and at an opening 5 in its central extension 6 resulting in a cutter having less weight than cutter 1.

The central extension 6, see also Figs. 3 to 6, has an indentation 7 receiving a force-fitted buffer 8 therein containing a central recess 9 in which functions a driving pin, not shown. The recess 9 in the buffer 8 is reinforced internally, at least on its two opposite sides subjected to the action of the driving pin by a metal strip 10 suitably bent and having the ends 11, $11^1$ thereof bent back outside the buffer 8. The wings 12, $12^1$ of said buffer have a dove tail configuration. Due to this internal reinforcement, the buffer fulfills its shock absorbing purpose but is protected against the repeated shocks, of the order of 8000 to 9000 per minute, created by the driving pin.

I claim:

In an apparatus for dry shaving and hair clipping having a driving pin, a cutter comprising a cutter to be given a reciprocating rectilinear motion by the pin and having a lower central extension with bottom opening therein, a shock absorbing buffer extending within said extension opening and having a recess, and a metal reinforcement mounted inside said buffer recess for being engaged by the pin and being hooked on to two opposite sides of said buffer.

References Cited in the file of this patent

UNITED STATES PATENTS

| | | |
|---|---|---|
| 2,203,021 | Jones | June 4, 1940 |
| 2,221,314 | Nyhagen | Nov. 12, 1940 |
| 2,337,391 | Horowitz et al. | Dec. 21, 1943 |
| 2,376,197 | Schlottauer | May 15, 1945 |
| 2,822,610 | Kleinman | Feb. 11, 1958 |

FOREIGN PATENTS

| | | |
|---|---|---|
| 292,170 | Switzerland | July 3, 1951 |

UNITED STATES PATENT OFFICE
CERTIFICATION OF CORRECTION

Patent No. 2,968,095  January 17, 1961

Roger Préjean

It is hereby certified that error appears in the above numbered patent requiring correction and that the said Letters Patent should read as corrected below.

In the grant, lines 1 and 2, for "Roger Préjean, of Joffre la Celle-Saint Cloud, France." read -- Roger Préjean, of La Celle-Saint-Cloud (Seine et Oise), France, --; in the heading to the printed specification, line 4, for "Roger Préjean, Joffre la Celle-Saint Cloud, France" read -- Roger Préjean, La Celle-Saint-Cloud (Seine et Oise), France --.

Signed and sealed this 13th day of June 1961.

(SEAL)
Attest:

ERNEST W. SWIDER
Attesting Officer

DAVID L. LADD
Commissioner of Patents